No. 721,368. PATENTED FEB. 24, 1903.
A. HAMILTON.
TANK HEATER.
APPLICATION FILED JULY 5, 1902.
NO MODEL.
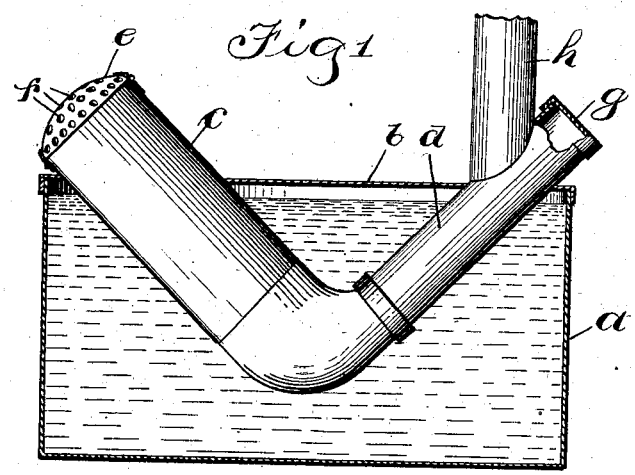
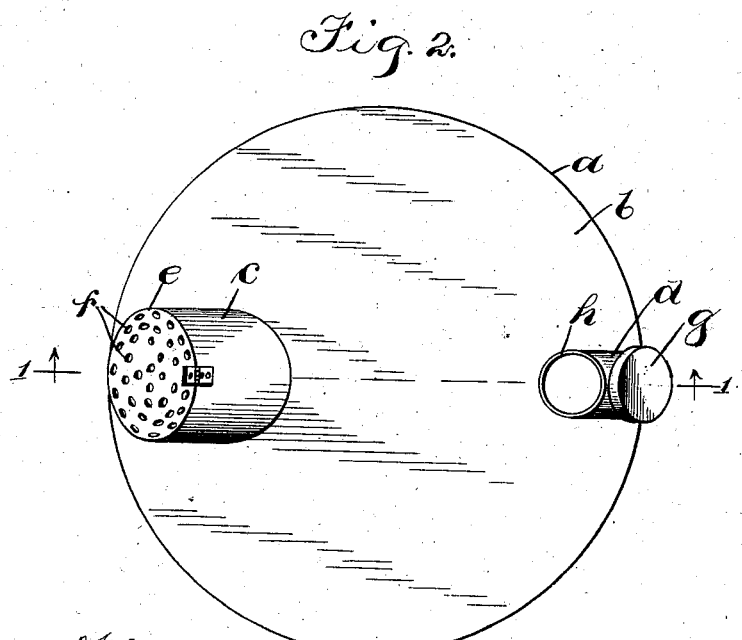
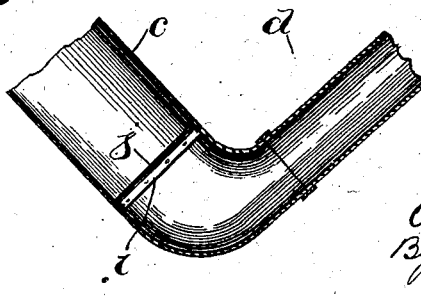

UNITED STATES PATENT OFFICE.

ANDREW HAMILTON, OF CHICAGO, ILLINOIS.

TANK-HEATER.

SPECIFICATION forming part of Letters Patent No. 721,368, dated February 24, 1903.

Application filed July 5, 1902. Serial No. 114,475. (No model.)

*To all whom it may concern:*

Be it known that I, ANDREW HAMILTON, of Chicago, in the county of Cook and State of Illinois, have invented certain new and useful Improvements in Tank-Heaters, of which the following is a full, clear, and exact description, reference being had to the accompanying drawings, forming a part of this specification, in which corresponding letters of reference in the different figures indicate like parts.

My invention has reference to heating devices such as are used for heating the water in tanks designed for the watering of stock and other analogous uses; and my object is to so construct such a heater that it may be simple, durable, and cheap, and may be placed within and removed from the tank without injury to the latter, and especially without forming openings in the walls thereof for the reception of parts of said heater.

A further object is to so construct said heater that any desired fuel, such as wood or coal, may be used therewith, while the ashes may be removed therefrom without interfering with the burning of the fuel, all of which is hereinafter more particularly described, and definitely pointed out in the claims.

In the drawings, Figure 1 is a vertical sectional view of a water-tank, showing my improved heater as it would appear therein when in use, said view being taken upon the line 1 1, Fig. 2. Fig. 2 is a plan view thereof; and Fig. 3 is a central vertical sectional view of a portion of said heater, showing the manner of placing a grate therein.

Referring to the drawings, $a$ represents the body of an ordinary water-tank, such as is ordinarily used by farmers for supplying water to stock. A cover $b$ is preferably fitted thereover in any approved manner, so as to retain the heat therein. Within said tank is placed my improved heater, which consists of a bent or elbow-shaped structure having a main body $c$, preferably circular in cross-section, and a subsidiary portion $d$, connecting therewith and forming a part thereof, the two being arranged to converge, as shown, at any desired angle to each other, the converging portion extending to at or near the bottom of the tank, while the extremities extend upwardly and project outwardly therefrom. The portion $c$ is preferably of larger diameter than that of the part $d$. For tanks of ordinary size I would recommend that the former be made about twelve and the latter six inches in diameter.

The part $c$ is provided with a hinged cover $e$, having suitable perforations $f$ therein to provide a draft for said heater, while upon the outer end of the part $d$ is placed a removable cover $g$ for the purpose hereinafter stated.

Connecting with the part $d$ and extending vertically therefrom is a smoke-pipe $h$, which may be of any desired length.

The operation of my improved device is as follows: A supply of fuel is placed in the part $c$ and lighted, the smoke passing out through the part $d$ and the pipe $h$. As ashes accumulate from time to time the cover $g$ is taken off and the ashes removed through the part $d$ by means of a suitable scraper without disturbing the fire.

The device shown in Fig. 1 is intended to be used without a grate, and I prefer to use it in that way, especially with wood or similar fuel; but should coal be employed I prefer to use a grate. In Fig. 3 I have shown a construction adapted for burning coal. Within the part $c$, near the bottom and preferably above the part $d$, I attach a support or ledge $i$, upon which is placed a removable grate $j$.

The simplicity of my device is obvious, while its salient advantages are that it may be placed within and removed from any tank without injury thereto, the fuel may be supplied and the ashes removed without removing the heater or quenching the fire, while the maximum heating-surface is in contact with the liquid to be heated.

It is obvious that the two parts $c\ d$ may be integral and of corresponding size and that they may be curved instead of straight or that the angle of inclination with respect to each other may be varied without departing from the principle involved.

Having thus described my invention, I claim—

1. A tank-heater consisting of a two-part body, one portion of which is inclined downwardly and the other upwardly, the latter being provided with an upturned branch smoke-pipe near its outer end and a removable cover at said outer end.

2. As an improved article of manufacture, a tank-heater consisting of a V-shaped heating-body having a smoke-pipe near the extremity of one branch and a removable cover at the end of said branch.

3. A device of the class described, consisting of a main cylindrical body, a door or cap for closing its outer end, means for admitting air to said body, a branch of smaller diameter arranged at an angle thereto, means for normally closing the outer end of said branch and a smoke-pipe in communication with said branch.

4. The combination with a tank of a V-shaped heater, the body of which is inclined downwardly and thence upwardly, means for admitting air at the upper end of one branch, a smoke-pipe communicating with the other branch and means for normally closing the outer end of said last-named branch.

In testimony whereof I have signed this specification, in the presence of two subscribing witnesses, this 30th day of June, 1902.

ANDREW HAMILTON.

Witnesses:
D. H. FLETCHER,
FRANK A. HEBNER.